United States Patent [19]

Rolston et al.

[11] 4,025,560

[45] May 24, 1977

[54] PROCESS FOR THE EXCHANGE OF HYDROGEN ISOTOPES BETWEEN STREAMS OF GASEOUS HYDROGEN AND LIQUID WATER

[75] Inventors: John H. Rolston; William H. Stevens; James Denhartog; John P. Butler, all of Deep River, Canada

[73] Assignee: Atomic Energy of Canada Limited, Ottawa, Canada

[22] Filed: Dec. 12, 1973

[21] Appl. No.: 424,172

Related U.S. Application Data

[63] Continuation-in-part of Ser. No. 263,261, June 15, 1972, abandoned.

[30] Foreign Application Priority Data

July 29, 1971 Canada ................................. 119402

[52] U.S. Cl. ............................ 423/580; 423/648 A
[51] Int. Cl.$^2$ .......................................... C01B 5/02
[58] Field of Search ........................... 423/580, 648; 117/135.5

[56] References Cited

UNITED STATES PATENTS

| 2,690,379 | 9/1954 | Urey et al. .......................... 423/580 |
| 3,681,021 | 8/1972 | Mikovsky et al. ................... 423/580 |

OTHER PUBLICATIONS

Lewis et al., "Industrial Chemistry of Collodial and Amorphous Materials," The MacMillan Company, New York, 1943, p. 91.

Primary Examiner—Earl C. Thomas
Attorney, Agent, or Firm—Francis W. Lemon

[57] ABSTRACT

A process for the exchange of hydrogen isotopes between streams of gaseous hydrogen and liquid water, wherein the streams are brought into contact with one another and a catalyst assembly at a temperature in the range 0°–300° C. The catalyst is an inherently hydrophobic material such as polytetrafluoroethylene, polyethylene, polystyrene, polymethacrylate, polypropylene or carbon black carrying a catalytically active metal, for example, platinum, rhodium and nickel. The inherently hydrophobic support allows the catalytically active metal to catalyze the hydrogen isotope exchange reaction between hydrogen gas and water vapor in the presence of liquid water while retarding loss of activity of the catalytically active metal by contact of the metal catalyst with liquid water. This catalyzed chemical isotope exchange proceeds simultaneously with isotope exchange from water vapor to liquid water by a non-catalyzed, physical evaporation and condensation exchange reaction to effect an overall rapid catalytic isotopic exchange between streams of hydrogen gas and liquid water.

8 Claims, No Drawings

PROCESS FOR THE EXCHANGE OF HYDROGEN ISOTOPES BETWEEN STREAMS OF GASEOUS HYDROGEN AND LIQUID WATER

This is a continuation-in-part of application of application Ser. No. 263,261, filed June 15, 1972, now abandoned.

This invention relates to a process for the exchange of hydrogen isotopes between streams of gaseous hydrogen and liquid water.

U.S. Pat. No. 2,690,379, dated 1954, H. C. Urey and A. V. Gross, discloses a process for the production of deuterium oxide, by bringing deuterium containing hydrogen and water together in a reaction chamber, and catalyzing the equilibrium reaction between them by means of a catalyst selected from or compounded from nickel, cobalt, iron, ruthenium, rhodium, palladium, osmium, iridium, platinum, molybdenum, tungsten and rhenium on a relatively inert base. This isotopic enrichment process is an example of the application of a chemical exchange reaction between two hydrogen-containing species to the separation of two isotopes of hydrogen which differ in their atomic mass. By way of example this chemical exchange reaction can be written in terms of the light isotope, protium (H), and the heavier isotope, deuterium (D) as $$H_2O + HD \rightleftarrows HDO + H_2 \quad (1)$$

where the equilibrium constant, $K_1$, is given in terms of the molar concentrations as $$K_1 = \frac{[HDO] \cdot [H_2]}{[HD] \cdot [H_2O]} \quad (2)$$

The degree of isotopic separaton for the chemical exchange process between streams of hydrogen and liquid water can be characterized by the separation coefficient, $\alpha$, which is defined as the ratio of the atom fractions of the heavy to light isotopes in the water phase relative to those in the hydrogen gas.

$$\alpha = \frac{\left[\frac{D}{H}\right] \text{liquid } H_2O}{\left[\frac{D}{H}\right] \text{gas } H_2} \quad (3)$$

The magnitude of the process separation coefficient, $\alpha$, is proportional to the equilibrium constant, $K_1$, of the chemical exchange reaction and varies with temperature, but as defined, is always greater than unity. Hence, under conditions of isotopic equilibrium between streams of liquid water and hydrogen gas, the deuterium concentration in the liquid water, $(D/H)_{liquid}$, is always greater than the deuterium concentration in the hydrogen gas, $(D/H)_{gas}$. In a separation process in which streams of hydrogen and liquid water, carrying deuterium concentrations other than the equilibrium concentration, are brought into contact with one another, under conditions where distribution of the hydrogen isotopes can occur, there will be a net transfer of atoms of the heavy isotope from one phase to the other which is exactly offset by a net transfer of atoms of the light isotope in the opposite direction. The net transfer will tend to proceed until the ratio of the isotopic contents of the two streams reaches the equilibrium value given by equation (3). As isotopic equilibrium between the two streams is being established the initial concentration of the heavier hydrogen isotope (deuterium) in one stream will be raised above its initial level to approach the new equilibrium value which is characteristic of the temperature and operating conditions of the process.

It is a desirable feature of any practical process involving transfer of hydrogen isotopes between streams of hydrogen and liquid water that the transfer proceed at the highest possible rate so that the equilibrium distribution of the isotopes be attained in the shortest possible time. This is particularly important in a multi-stage or cascade process, such as described by M. Benedict and T. H. Pigford in Nuclear Chemical Engineering, McGraw-Hill, 1957, in which the streams of hydrogen gas and liquid water are required to flow substantially in opposite directions between stages, although not necessarily within each stage. In such a process, a stage can be defined as the nut volume through which streams of hydrogen and liquid water pass and in which the approach to the equilibrium isotope distribution can be measured or calculated in some reasonable manner.

The most economical and efficient way to accomplish a counter-current flow of the two streams is to keep the bulk of the water continuously in the liquid state and to flow this in the opposite direction to the gaseous hydrogen, except for the water vapour that of necessity is contained as humidity in the hydrogen gas in contact with liquid water.

One major problem with the process disclosed in the above United States patent is that, while the catalysts have been found to catalyze the hydrogen isotope exchange between hydrogen and water vapour, these same catalysts show a large and undesirable loss of activity when brought into intimate contact with liquid water. The catalytically active metal particles thereby become submerged in liquid water. This drastically limits the rate of the exchange since only hydrogen dissolved in the liquid is then readily available for isotopic exchange. In the presence of liquid water the resulting activity is too low for the process to be economical and so in the plant described in "Production of Heavy Water" by M. Murphy, H. C. Urey and I. Kirshenbaum, McGraw-Hill Book Co., N.Y., 1955, p. 14, contact of liquid water with the catalyst was prevented by physically separating the catalyst from the stream of liquid water and by maintaining the relative humidity of the process stream while in contact with the catalyst below the saturation level. Such a process, while operable in a satisfactory manner, is expensive, and so it would be desirable to provide a hydrogen isotope exchange process between streams of gaseous hydrogen and liquid water wherein the catalyst assembly need not be physically separated from the stream of liquid water and deactivation of the catalytically active metal by submersion in liquid water stream is prevented. According to the present invention this is in large measure accomplished by choosing to deposit the catalytically active metal on a support surface which can be described as inherently hydrophobic. For the purposes of this discussion a hydrophobic surface is one upon which liquid water does not spread into a thin film, but stands up in the form of droplets. This feature prevents catalyst particles from being submerged in a continuous layer of liquid water and prevents, to a large extent, the so called liquid water "poisoning" of the catalyst.

In this process the overall catalytic exchange of isotopes between streams of hydrogen and liquid water primarily occurs by the two-step exchange process with the following simultaneous reactions being closely coupled in space.

STEP 1

Step 1

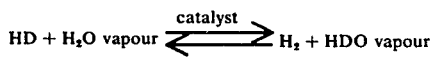

Step 2

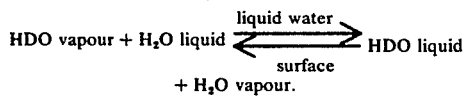

These two steps are achieved, according to the present invention, by providing at least one catalyst assembly having a metallic catalyst consisting of at least one Group VIII metal, deposited on a porous, inherently hydrophobic support. The latter substantially preventing the catalyst from being submerged by the liquid water stream while allowing hydrogen gas and water vapour to rapidly contact the catalyst, whereby even though streams of liquid water and hydrogen gas are brought into contact with each other in the presence of the catalyst assembly, the exchange occurs primarily by the two steps mentioned above.

It is an object of the present invention to provide a hydrogen isotope exchange process between streams of gaseous hydrogen and liquid water wherein the catalyst assembly need not be physically separated from the stream of liquid water and deactivation of the catalytically active metal by submersion in liquid water stream is substantially prevented.

According to the present invention there is provided a process for the exchange of hydrogen isotopes between streams of gaseous hydrogen and liquid water, comprising:

a. bringing the streams into contact with one another and a catalyst assembly at an operating temperature in the range 0° to 300° C, with one of the streams containing a concentration of a hydrogen isotope in excess of that which it would contain when the liquid water-gaseous hydrogen streams are in isotopic equilibrium at the operating conditions of temperature and mass flow rates of the streams and the other being a deficient stream and containing a concentration of that hydrogen isotope which is less than that which it would contain when the liquid water-gas system is in equilibrium at said operating conditions, so that the deficient stream is enriched by transfer of the hydrogen isotope in a two-step hydrogen isotope exchange from the other stream, and b. recovering the said stream enriched in the hydrogen isotope, and wherein the improvement comprises:

c. the catalyst assembly comprises at least one porous, hydrophobic support with the support surface having exposed catalyst particles of at least one element selected from Group VIII of the Periodic Table, such that the support substantially inhibits the contact of liquid water with the catalyst particles while allowing contact therewith of hydrogen gas and water vapour from the liquid water so that the hydrogen isotope exchange occurs simultaneously between hydrogen gas and water vapour contacting the catalyst particles, and between water vapour contacting the liquid water and that liquid water, and whereby submersion of the catalyst particles in liquid water is largely prevented.

The catalyst support is preferably a porous material of large internal surface area into which a soluble form of the catalyst, chemically bound in an ionic compound or covalent complex, may be impregnated. The catalyst particles are then deposited on the surface of the support by evaporating the solvent and heating the metal compound or complex at elevated temperatures in the presence of hydrogen to effect a chemical reduction to the metallic state.

Alternative means of dispersing the metallic catalyst particles in slurries or colloidal suspensions, and depositing them on or into the porous support by evaporative techniques will suggest themselves to those skilled in the art of catalyst preparation. Furthermore the method of reducing the metal compound or complex may be altered to include treatment with solutions or slurries of reducing agents such as hydrazine and insoluble metal hydrides respectively.

Preferably when a porous support is used it is of material selected from the group polytetrafluoroethylene, polyethylene, polystyrene, polymethylmethacrylate, polypropylene and hydrophobic carbons, or mixtures thereof, whose surfaces are not wetted by liquid water. Such porous supports, when immersed in liquid water are unable to absorb liquid water without the addition of wetting agents or the application of external pressure to the liquid surface, and therefore, are capable of retaining much of their internal porosity free of liquid water and available only to the hydrogen gas and water vapour. The catalytically active metal, deposited therein and preferably selected from platinum, rhodium, and nickel, remains substantially free of liquid water and available to effect the exchange of isotopes between hydrogen gas and water vapour.

In some embodiments of the invention the catalyst assembly, which contacts the streams of hydrogen gas and liquid water, but which allows only hydrogen gas and water vapour to effectively contact the metallic catalyst particles, comprises a plurality of discrete bodies disposed as a packed column or bed, the size of individual bodies being chosen so as to allow the streams of liquid water and hydrogen gas to pass between and around said bodies with the minimum impedence consistent with the mass flows of the two streams and good engineering practice for packed columns.

Individual bodies comprising the packed columns may be composed entirely of catalyst particles dispersed in porous hydrophobic supports or may alternatively be constructed from large non-porous forms onto which smaller bodies of the porous hydrophobic support carrying the dispersed metal catalyst particles are attached in a thin outer coating. This latter arrangement can be used to advantage in that considerable economy of catalyst and hydrophobic support is achieved. Also the catalyst particles and hydrophobic support are on the outer surface of the non-porous form so that the catalyst particles remain freely accessible to the gaseous mixture of hydrogen and water vapour and in close proximity to the bulk stream of liquid water, which is prevented from immersing said particles by the non-wetting action of the surrounding hydrophobic surface.

If desired, the stream of gaseous hydrogen may be fed upwardly into contact with the catalyst assembly and the stream of liquid water is trickled downwardly into contact with the catalyst assembly, in a manner commonly described in the chemical engineering literature as trickle bed operation.

Alternatively, both the stream of gaseous hydrogen and the stream of liquid water may be fed con-currently upward or downward into contact with the catalyst assembly.

The catalytically active metal may be 0.005 to 10.0 percent by weight and preferably 0.05 to 1.0 percent by weight of the catalyst assembly.

Clearly the temperature at which the streams are brought into contact with one another and the catalyst assembly is restricted to a temperature below that at which the particular support material used is thermally stable and below that at which it loses its hydrophobic character. Even so the exchange process may be conducted at several temperatures as shown in the following examples which illustrate the rate of exchange k (defined later) for polytetrafluoroethylene supports compared with the exchange rates k for other support materials.

EXAMPLE 1

Platinum Catalyst Dispersed in Porous Polytetrafluoroethylene Support

Twenty-five grams of 3 mm porous polytetrafluoroethylene (PTFE) cubes as supports were immersed in an acetone solution of a platinum compound, typically hexachloroplatinic acid, so that the solution which wets the PTFE, was absorbed into the void spaces of the support cubes. The excess solution was decanted and the solvent entrapped in the support cubes was allowed to evaporate in a current of air thereby depositing the platinum compound on the internal surfaces of the porous support cubes. This procedure was repeated until sufficient compound had been deposited to equal a nominal 0.5% by weight loading of platinum on the support cubes. The compound was then reduced to the metallic catalyst particle state in a current of hydrogen at 300° C for three hours, cooled to ambient temperature and the resulting catalyst particles dispersed in polytetrafluoroethylene as exposed catalyst particles were loaded as catalyst assemblies into a glass column with a cross section of 2.16 cm$^2$.

Provision was made to contact the catalyst assemblies with a flow of purified gaseous hydrogen of near natural isotopic abundance (D/H = 118 ppm) and with deuterium enriched liquid water (D/H = 1140) so that the gaseous hydrogen stream passed upward through the bed and the stream of liquid water passed downward through the bed. The extent of isotope transfer between the two streams was measured by removing the entrained water vapour from the hydrogen after passage through the column and monitoring the increase in the deuterium content of the hydrogen stream free of water vapour.

The exchange efficiency ($\epsilon$) of the column was expressed as the fractional approach to equilibrium enrichment of the gaseous hydrogen phase in which $n_o$, $n_e$ and $n$ are the initial, equilibrium and observed atom fractions of deuterium in the gaseous hydrogen stream.

$$\epsilon = \frac{n - n_o}{n_e - n_o}$$

Representative values of the efficiency measured after selected time intervals of continuous column operation and at several hydrogen flow rates at 26° C are given in the accompanying table.

Although the column efficiency, $\epsilon$, is useful for assessing the approach to the equilibrium isotope distribution, in an exchange column operating at a given condition, it is necessary to relate it to the rate of isotope transfer between the streams of liquid water and hydrogen gas under a variety of conditions. This is achieved by calculating the overall rate of deuterium transfer, k, to the hydrogen phase as hydrogen deuteride, HD, at unit displacement from the equilibrium concentration and per unit weight of catalyst, as cm$^3$ HD at STP per second per gram of catalyst. The rate of exchange can be calculated from the expression:

$$k = \left[\frac{F_{H_2}}{w}\right] \cdot [-\ln(1-\epsilon)]$$

where, $F_H$ is the total volumetric flow of hydrogen gas per second measured at a standard temperature and pressure (STP) of zero degrees Centigrade and one atmosphere pressure and W is the weight of catalyst in grams. It follows that high rates of isotope transfer are necessary to achieve an economical process for exchanging isotopes between streams of hydrogen and liquid water. Values of k are therefore included in the accompanying tables.

TABLE 1

Platinum Catalyst Dispersed in a Polytetrafluoroethylene Support Counter-Current Flows at 26° C over 25 g of Catalyst

| Time (hr.) | Linear H$_2$ Flow Rate at STP (cm/s) | Liquid H$_2$O Mass Flow Rate (g/min) | Column Efficiency ($\epsilon$) | Exchange Rate k (cm$^3$ HD/s-g) |
|---|---|---|---|---|
| 1.25 | 6.7 | 0.9 | .54 | .45 |
| 7.0 | 6.7 | 0.9 | .39 | .29 |
| 26 | 6.6 | 0.9 | .42 | .31 |
| 43 | 6.6 | 0.9 | .40 | .29 |
| 49 | 6.6 | 0.9 | .42 | .31 |
| 66 | 6.6 | 0.9 | .35 | .25 |
| 67 | .85 | 2.0 | .95 | .22 |
| 68 | 2.17 | 2.0 | .73 | .25 |
| 68.5 | 5.00 | 2.0 | .46 | .27 |
| 69 | 6.6 | 2.0 | .38 | .27 |
| 69.5 | 11.8 | 2.0 | .26 | .31 |
| 70 | 15.1 | 2.0 | .20 | .29 |
| 70.5 | 17.7 | 2.0 | .19 | .32 |
| 71 | 6.6 | 0.9 | .35 | .25 |
| 138 | 6.7 | 0.9 | .33 | .23 |

EXAMPLE 2

Platinum Catalyst Dispersed on a Porous Alumina Support

This suport material is included as a typical example of a support which gives an extremely efficient catalyst for isotopic exchange between streams of hydrogen and water vapour (liquid phase absent) but which does not inhibit the contact of liquid water with the catalyst particles when operated in the presence of liquid water. Accordingly a catalyst containing a 0.5% platinum loading on 3.2 mm right cylinders of porous alumina was prepared in the manner outlined above and the rate of isotope exchange between streams of hydrogen and water vapour only was measured in an exchange column of 1 cm² cross section. Thereafter a portion of this catalyst was tested for catalytic activity in the presence of liquid water under conditions comparable to those given in Example 1. The data listed in Table 2 show that much higher rates of exchange are possible over this catalyst if liquid water is excluded from the column and the rates for exchange between streams of hydrogen and liquid water are only a fraction (1/50) of those measured over a similar catalyst prepared on a porous hydrophobic support (Example 1).

TABLE 2

Platinum Catalyst Dispersed in a Porous Alumina Support -

Vapour Phase - Con-current Flows over 12.7 mg of Catalyst

| Time (hr) | Linear $H_2$ Flow at STP (cm/s) | Linear $H_2O$ Vapour Flow at STP (cm/s) | Column Efficiency ($\epsilon$) | Exchange Rate k (cm³ HD/s-g) |
|---|---|---|---|---|
| 5 | 11.8 | .46 | .13 | 129 |
| 8 | 11.8 | .46 | .12 | 119 |

Liquid Phase - Con-current Flows over 25 g of Catalyst at 26° C

| Time (hr) | Linear $H_2$ Flow at STP (cm/s) | Liquid Water Mass Flow (g/min) | Column Efficiency ($\epsilon$) | Exchange Rate k (cm³ HD/s-g) |
|---|---|---|---|---|
| .5 | 6.4 | 3.0 | .005 | .0028 |

Liquid Phase - Counter-current Flows over 25 g of Catalyst at 26° C

| .5 | 6.4 | 3.0 | .009 | .0050 |
| .8 | 3.9 | 3.0 | .018 | .0061 |
| 1.0 | 2.4 | 3.0 | .030 | .0063 |

EXAMPLE 3

Platinum Catalyst Dispersed in a Porous Polyethylene Support

Twenty-five grams of catalyst were prepared as described in Example 1 and were reduced at 125° C for 16 hours. Table 3 gives representative data for this catalyst assembly containing 1.3% by weight platinum catalyst in an exchange column with a cross section of 2.16 cm².

TABLE 3

Platinum Catalyst Dispersed in a Porous Polyethylene Support - Counter-current Flows at 25° C

| Time (hr) | Linear $H_2$ Flow at STP (cm/s) | Liquid $H_2O$ Mass Flow (g/min) | Column Efficiency ($\epsilon$) | Exchange Rate k (cm³ HD/s-g) |
|---|---|---|---|---|
| 2 | 2.6 | 2.0 | .50 | .16 |
| 5 | 4.0 | 2.0 | .08 | .03 |
| 7 | 3.4 | 2.0 | .11 | .03 |

EXAMPLE 4

Platinum Catalyst Dispersed in Porous Polystyrene Support

A 1.66 gm sample of porous polystyrene support in the form of 80-100 mesh particles was impregnated with an acetone solution of hexachloroplatinic acid. The sample was reduced in dry hydrogen at 200° C for 8 hours as described in Example 1, and constrained in the column between two porous frits. The metal particle loading of this catalyst was 0.5 weight percent and the activity measurements are listed in Table 4.

TABLE 4

Platinum Catalyst Dispersed in a Porous Polystyrene Support - Con-current Flows at 25° C

| Time (hr) | Linear $H_2$ Flow at STP (cm/s) | Liquid $H_2O$ Mass Flow (g/min) | Column Efficiency ($\epsilon$) | Exchange Rate k (cm³ HD/s-g) |
|---|---|---|---|---|
| 2.5 | 15.2 | 2.0 | .89 | 44 |
| 9.0 | 24.0 | 2.0 | .44 | 18 |

Examples 1-4 above illustrate the necessity for supporting the platinum catalyst particles on inherently hydrophobic surfaces in order to obtain catalysts for isotopic exchange between streams of hydrogen and liquid water. A further embodiment of this principle, which enhances the disposition of the platinum catalyst, is to deposit the platinum metal as particles on a porous, high surface area, hydrophobic material and to bind these particles to the surface of larger catalytically inert, non-porous bodies which are suitable as column packings. Catalyst assemblies prepared in this fashion offer improved contact between the platinum catalyst and the gaseous components while retaining their ability to exclude liquid water from contact with the platinum catalyst particles.

EXAMPLE 5

Platinum Catalyst Dispersed in Porous Hydrophobic Carbon Bonded to Ceramic Saddles Non-porous ¼ inch ceramic saddles were covered by a thin, tacky coating of a thermosetting silicon adhesive (Dow Corning 40C). The coated saddles were tumbled in a hydrophobic carbon powder (28-150 mesh) containing 0.45 percent by weight platinum. Loosely adhering powder was removed and the covered saddles were transferred to a vacuum oven to remove the residual volatile solvent (1 hour at 100° C). A total of 5.0 g of resin and powder was bound in a thin outer layer to the surface of 38 g of ceramic saddles to give a nominal platinum loading of 0.02 weight percent. The catalyst activity of this catalyst, listed in Table 5, was measured in packed columns over a range of temperatures and flows.

TABLE 5

Platinum Catalyst Dispersed in Porous Hydrophobic Carbon and Bonded to Ceramic Saddle Supports- Counter-current Flows at 25° C and 38° C

| Time (hr) | Linear $H_2$ Flow at STP (cm/s) | Liquid $H_2O$ Mass Flow (g/min) | Column Efficiency ($\epsilon$) | Exchange Rate k (cm³ HD/s-g) |
|---|---|---|---|---|
| Run A, 43 g catalyst 25° C; column area 4.83 cm² | | | | |
| 3.5 | 13.4 | 23 | .073 | .114 |
| 5 | 5.6 | 23 | .136 | .092 |
| 5.5 | 21.5 | 23 | .052 | .129 |
| Run B, 33 g catalyst 25° C; column area 5.46 cm² | | | | |
| 0.3 | 5.6 | 26 | .096 | .092 |
| 1.3 | 5.5 | 26 | .091 | .085 |
| 2.5 | 5.6 | 26 | .087 | .083 |
| 3.5 | 5.7 | 26 | .083 | .080 |
| 3.7 | 13.4 | 26 | .043 | .096 |
| 4.3 | 6.9 | 26 | .069 | .080 |
| Run C, 33 g catalyst 38° C; column area 5.46 cm² | | | | |
| 1.0 | 6.9 | 26 | .122 | .149 |
| 2.2 | 7.0 | 26 | .118 | .145 |

EXAMPLE 6

Rhodium Catalyst Dispersed in Porous Polytetrafluoroethylene Support

A rhodium catalyst was prepared by the procedure given in Example 1. A total of 8.7 g of porous polytetrafluoroethylene cubes were treated with an acetone solution of rhodium trichloride and hydrogen to produce a catalyst containing 0.09 percent by weight of rhodium metal. The catalyst was tested for deuterium transfer between streams of hydrogen and liquid water at 21° C in an exchange column with a cross-section of 1.77 cm². The results are given in Table 6.

TABLE 6

Rhodium Catalyst Dispersed in a Polytetrafluoroethylene Support- Counter-current Flows at 21° C over 8.7 g of Catalyst

| Time (hr) | Linear $H_2$ Flow Rate at STP (cm/s) | Liquid $H_2O$ Mass Flow Rate (g/min) | Column Efficiency ($\epsilon$) | Exchange Rate k (cm³ HD/s-g) |
|---|---|---|---|---|
| 0.15 | 1.7 | 0.4 | .048 | .017 |
| 0.21 | 1.7 | 0.4 | .048 | .017 |
| 0.25 | 1.7 | 0.4 | .046 | .016 |
| 0.92 | 1.7 | 0.4 | .036 | .013 |
| 1.00 | 1.7 | 0.4 | .035 | .012 |
| 1.67 | 1.7 | 0.4 | .040 | .014 |
| 2.50 | 1.7 | 0.4 | .038 | .013 |
| 19.14 | 1.7 | 0.4 | .021 | .007 |

According to the present invention and taking deuterium exchange as an example, it can be deduced from the above examples that the overall catalyzed hydrogen isotope exchange process between streams of hydrogen and liquid water occurs by the following simultaneously occurring steps:

Step 1

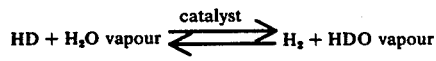

$$HD + H_2O \text{ vapour} \underset{}{\overset{\text{catalyst}}{\rightleftharpoons}} H_2 + HDO \text{ vapour}$$

Step 2

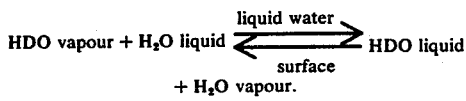

$$HDO \text{ vapour} + H_2O \text{ liquid} \underset{}{\overset{\text{liquid water surface}}{\rightleftharpoons}} HDO \text{ liquid} + H_2O \text{ vapour}.$$

By depositing the catalyst particles on porous hydrophobic surfaces it is possible to closely couple these reactions in space and to effect a rapid overall transfer of deuterium between streams of hydrogen and liquid water.

We claim:

1. A process for the exchange of hydrogen isotopes between streams of gaseous hydrogen and liquid water, comprising:
   a. bringing the streams into contact with one another and a catalyst assembly at an operating temperature in the range 0° to 300° C, with one of the streams containing a concentration of a hydrogen isotope in excess of that which it would contain when the liquid water-gaseous hydrogen streams are in isotopic equilibrium at the operating conditions of temperature and mass flow rates of the streams and the other being a deficient stream and containing a concentration of that hydrogen isotope which is less than that which it would contain when the liquid water-gas system is in equilibrium at said operating conditions, so that the deficient stream is enriched by transfer of the hydrogen isotope in a two-step hydrogen isotope exchange from the other stream, and
   b. recovering the said stream enriched in the hydrogen isotope, and wherein the improvement comprises:
   c. the catalyst assembly comprises at least one porous, support of polytetrafluoroethylene, with the support surface having exposed catalyst particles of at least one element selected from Group VIII of the Periodic Table, such that the support substantially inhibits the contact of liquid water with the catalyst particles while allowing contact therewith of hydrogen gas and water vapour from the liquid water so that the hydrogen isotope exchange occurs simultaneously between hydrogen gas and water vapour containing the catalyst particles, and between water vapour contacting the liquid water and that liquid water, and whereby submersion of the catalyst particles in liquid water is largely prevented.

2. The process according to claim 1, wherein a solution of a catalyst compound is impregnated into the porous support, and the catalyst compound is deposited from the solution onto the surface of the support and is converted to metallic catalyst particles by chemical reduction at elevated temperatures.

3. The process according to claim 2, wherein the catalyst is selected from the group consisting of platinum, nickel and rhodium.

4. The process according to claim 3, wherein the catalytically active metal is between 0.005 and 10.0 percent by weight of the catalyst assembly.

5. The process according to claim 3, wherein the catalytically active metal is preferably between 0.05 and 1.0 percent by weight of the catalyst assembly.

6. The process according to claim 1, wherein the catalyst assembly comprises a plurality of discrete bodies disposed as a bed.

7. The process according to claim 1, wherein the stream of gaseous hydrogen is fed upwardly into contact with the catalyst assembly in counter-current fashion to the stream of liquid water.

8. The process according to claim 1, wherein the stream of gaseous hydrogen and the stream of liquid water are fed con-currently upwardly or downwardly into contact with the catalyst assembly.

* * * * *